May 18, 1965 V. F. ESOLDI 3,184,191
ELECTRICAL OUTLET BOX HOLDER
Filed July 23, 1963

INVENTOR
VINCENT ESOLDI
BY
*Joseph P. Kearns*
ATTORNEY

United States Patent Office 3,184,191
Patented May 18, 1965

3,184,191
ELECTRICAL OUTLET BOX HOLDER
Vincent F. Esoldi, Stirling, N.J., assignor to Wej-Loc, Inc.,
West Orange, N.J., a corporation of New Jersey
Filed July 23, 1963, Ser. No. 297,145
10 Claims. (Cl. 248—27)

This invention relates to electrical junction or outlet boxes and specifically to means for quickly and conveniently attaching such boxes to wall apertures.

Many devices have been proposed for securing electrical switchboxes in proper position in wallboards of completed buildings. A common type of box holder employs a stiff back member with forwardly projecting ears. The back member is longer than the vertical dimension of the box and must be inserted end first between the wall opening and the side of the box at an angle. It must then be rocked in such a way that the other end of the back member is forced into the slot between the wall edge and the side of the box. Finally the device is centered and the ears are pulled forward and bent over into the box. One disadvantage of this type of holder is that only the thin edge of the back member bears on the back of the wall surface. Where a switch is mounted in the installed box, repeated switch operation causes the thin edge of the holder to tear the corners of the wall opening, thereby loosening the box. Another is that the stiff back member tends to foul or snag on the screws and lugs of break-away boxes during insertion.

The object of this invention is to simplify the installation of electrical switchboxes and the like in wallboard openings.

It is another object of this invention to provide a switchbox fastener which is simple and inexpensive to manufacture.

It is a further object of this invention to provide a snug and firm mounting for electrical outlet boxes in wallboard openings.

According to this invention a fastener device is punched, stamped or cut from thin, relatively ductile sheet material such as steel, copper, aluminum or the like generally in the shape of a block letter E. The back and three extensions are preferably of about the same length and width so that the back dimension is somewhat shorter than the side dimension along the width of the back and the extension. The whole device is adapted to be inserted between the edge of a wall opening cut to conform loosely to the outside dimensions of a rigid electrical receptacle box and the side of the receptacle box. The receptacle box is assumed to be provided with so-called plaster ears along its narrow sides to prevent rearward motion of the receptacle box into the opening beyond a position flush with the outer wall surface. When inserted back first about half the extension length the outer extensions are bent over the edge of the side of the receptacle box with the fingers and held in this loose position. The center extension is pulled firmly forward away from the wall and causes the back strip to be bent away from the side of the receptacle box into broad surface contact with the back surface of the wall. At the same time the outer extensions are deformed against the side of the receptacle box at about 45° thereto, thus wedging the receptacle box into the wall opening. The outer end of the inner extension can then be bent over the edge of the receptacle box between the two outer extensions and in the same plane therewith.

Two devices according to my invention installed against opposite sides of an electrical receptacle box provide a rigid mounting secure from lateral or vertical motion.

A particular advantage of this invention is its wedging action which locks the outlet box firmly in place in a wall opening.

Other objects and advantages of this invention will appear from a consideration of the following description and the drawing in which.

Figure 1:
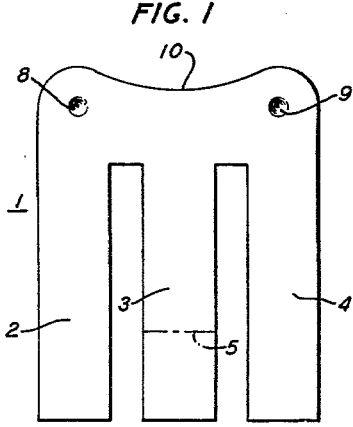
FIG. 1 is a plan view of the fastener device of this invention.
Figure 9:
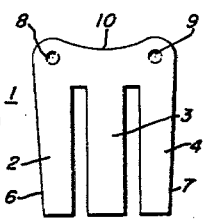
FIG. 9 is a plan view of the fastener device of this invention showing a modification with tapered edges.

FIG. 1 is a plan view of my fastener device 1 shaped generally in the form of the letter E with broad finger extensions or legs 2, 3 and 4. The back of the fastener 10 is preferably formed in a concave arch as shown in the drawing to aid in forming the correct bend during installation. Optionally embossings 8 and 9, formed as by a nail punch, are included to grip the back surface of the wallboard. The device 1 is shown with straight-sided outer edges. A modification in the shape of my fastener device is shown in FIG. 9. The same numerical designators as found in FIG. 1 are used. Dash-dot lines 6 and 7 in FIG. 9, however, indicate an alternative construction with tapered edges whereby bending of the outer legs into the interior of a switchbox is facilitated. Optional scoring is indicated by dash-dot line 5 on center leg 3 in order that this piece can be snapped off in finishing an installation.

Figure 2:
FIG. 2 is an edge view of the fastener device of this invention.
Figure 3:
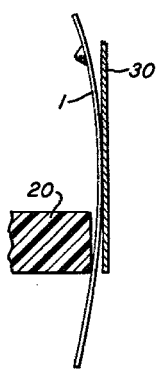
FIGS. 3, 4, 5 and 6 are cross-sectional views showing positions the device assumes during installation.

FIG. 2 is an edge view of my fastener showing a pronounced concavity toward the tips of the embossed detents 8 and 9 to simplify insertion between the edge of the wall opening and the switchbox. Shaping my fastener thus is convenient but not essential to the operation of my invention.

Figure 8:
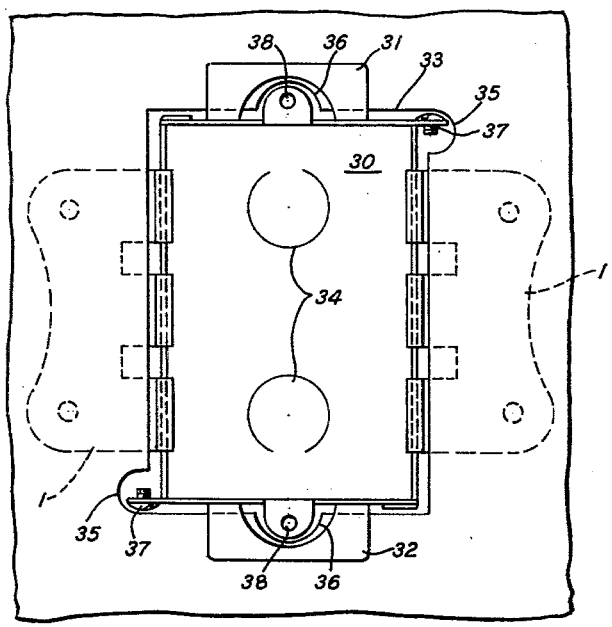
FIG. 8 is a view of a standard electrical outlet box arranged in a wall opening and secured in place with a pair of fasteners according to this invention.
Figure 5:
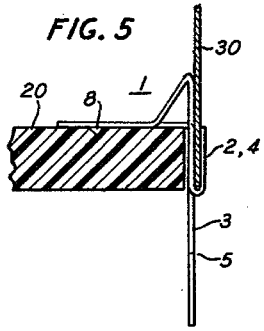

FIG. 8 shows a completed switchbox mounting using one of my fasteners 1 on each long side of a switchbox 30. A wall 20, which can vary in thickness from one-quarter of an inch to an inch or thereabouts and which can be of any construction material, such as Sheetrock or panel boards, has cut into it the usual switchbox opening defined by line 33. Corner notches 35 and end notches 36 afford clearance for the usual corner lugs 37 on break-away switchboxes and for cover clamping threaded holes 38. Knock-out holes in the box are denoted by designator 34. Box 30 includes so-called plaster ears 31 and 32 which prevent rearward movement of the box beyond the flush wall position. The location of fasteners 1 indicated by the dashed lines shows the broad bearing area obtained according to my invention with no tendency to rip or tear the corners of the wall opening.

Figure 4:
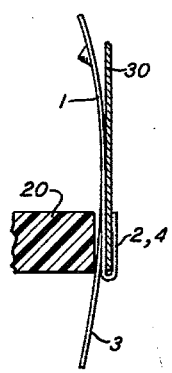
Figure 6:
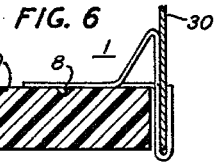
Figure 7:
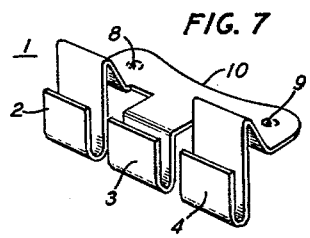
FIG. 7 is a perspective view of the fastener device of this invention as it appears when properly installed.

The method of installing my fasteners is demonstrated in the cross-sectional views of FIGS. 3 through 6. After the wall opening is made according to conventional procedures, as by sawing or drilling, the switchbox is positioned therein with plaster ears flush with the outer wall surface. A fastener is centered with respect to the long side of the box and inserted concave away from the box between the edge of the wall opening and one long side of the box as shown in section in FIG. 3. Element 20 (heavy crosshatching) is a section through the cut wallboard and element 30 (light crosshatching) is a section through the side of the switchbox. The concavity and thinness of the fastener make for easy insertion and the fastener readily slides past any projections on the outer surface of the box, such as knock-out holes or clamping lugs. With half-inch or so of the fastener protruding beyond the outer surface of the wall, the outer legs 2 and 4 are bent over into the inside of the box 30 as shown in FIG. 4. The bent-over outer legs can be held in this position with the fingers of one hand. The center leg 3 is now grasped with pliers held in the other hand or by the hand alone and pulled smartly away from the wall. This operation causes the fastener to assume the position shown in FIG. 5 with the back 10 of the fastener pulled toward the inner surface of the wallboard 20, the center leg 3 following the back surface and edge of the cut wallboard 20 and the outer legs 2 and 4 wedged up against the outer surface of the box 30. The embossed detents, if provided, grip the back surface of the wallboard as indicated and prevent slippage away from the box. The concavity initially in the fastener shown in FIG. 2 insures that the position shown in FIG. 5 will be taken during installation. Center leg 3 now extends well beyond the front face of the wallboard. The excess beyond scoring 5 can be snapped off to avoid any possible contact with the terminals of an electrical device later to be installed in the box. The remainder of leg 3 is folded over the edge of the box 30 in the same plane as the outer legs 2 and 4. Installation of one fastener is now complete, as shown in FIG. 6. A perspective view of a fastener as shaped after installation is shown in FIG. 7. Designators are the same as in FIG. 1.

Another fastener is installed on the other long side of the switchbox by the same method. With two of my fasteners in place the box is securely affixed to the wall opening and is firmly restrained from either side-to-side or up and down motion.

I have found 15-gauge aluminum to be particularly suitable for constructing my fasteners. They possess the requisite degree of flexibility or resilience. They are readily formed by a single pass of a punch press and can be packed flat in layers. The concavity shown in FIG. 2 can conveniently be imparted on the job site, if desired. For installation of boxes in partitions thicker than the usual half-inch wallboard, longer legs can be simply provided.

Should it become necessary to remove a switchbox secured to a wall by the use of my fasteners, disengagement by finger action only is readily accomplished.

Although a preferred embodiment of my invention is shown and described herein, it will be understood that modifications may be made without departing from the spirit and scope of the invention as set forth in the appended claims.

What is claimed is:

1. A fastener for affixing an electric switchbox to a hollow wall comprising a flat sheet of thin ductile metal having a length slightly longer than its width and being cut to define a back member along the width dimension and at least three substantially equal width legs spaced apart and set perpendicular to said back member, said fastener to be inserted back member first through the slotted opening included between the edge of a cut-out in said wall of the size of the outside dimensions of a switchbox to be affixed to said wall and the side of the switchbox, the outer legs of said fastener to be bent over the edge of said switchbox set flush with the outer surface of said wall while a center leg is pulled through said opening to deform said back member and said outer legs into wedging engagement between the back surface of said wall and a side of said switchbox, and the outer end of said center leg to be bent over the edge of said switchbox in the plane of said outer legs after being pulled to its limit.

2. The fastener of claim 1 in which the outer edge of said back member is concavely formed to produce a tendency to fold toward the back surface of the wall when the center leg is pulled away from said wall.

3. The fastener of claim 1 in which two or more embossings are punched near the outer edge of said back member to grip the back surface of said wall firmly when installed.

4. The fastener of claim 1 in which the center leg is scored transversely a predetermined distance from the outer end for break-off after installation so that the length of all three legs bent over inside the switchbox after installation is uniform.

5. The fastener of claim 1 in which the outer edges of said outer legs are tapered along their length away from said back member to provide clearance when bent over from projecting lugs in the corners of said switchbox.

6. The fastener of claim 1 in which an arch is formed to facilitate preliminary insertion between the edges of the wall opening and the sides of the switchbox without snagging on projections on the sides or corners of a switchbox.

7. The fastener of claim 1 in which pointed embossings are punched near the outer edge of the back member for biting into the back surface of said wall when installed and an arch is formed along said legs concave toward the points of said embossings to facilitate insertion along the side of the switchbox and to insure bending toward the back surface of said wall when the center leg is drawn away from the wall.

8. A holder for securing an electrical outlet box to a hollow wall or the like comprising a punching of thin ductile material having generally the shape of the letter E, the back member of which is shorter than the length of the side of the box to be secured, the three finger members are comparable in length to the back member and the width of all four members is substantially uniform, a complete holder being inserted back member first on each opposite side of an outlet box against the edges of an opening in the wall thereat, all outer fingers of the holders being bent loosely over the edges of said box, the inner fingers being first pulled outward from the wall to force the back member and the outer fingers into a firm, locking relationship between the back surface of the wall and the sides of the box, and the outer ends of the inner fingers being finally bent over the edges of said box between said outer fingers.

9. A switchbox holder for supporting a switchbox in an opening in a supporting wall comprising a thin, elongated flat sheet metal strip shorter than the side dimension of the switchbox to be supported and having at least three lateral extensions projecting from an edge of said strip for a length approximately the same as said strip, and all three extensions being adapted to engage over the outer edge of a side of a switchbox, a center extension being first drawn forward against the side of the switchbox to pull the strip into flat-surface engagement with the back surface of the wall and to deform the outer extensions into wedging relationship between the back of said wall and the sides of the switchbox.

10. The method of fastening an electrical receptacle box in a prepared opening in wallboard conforming to the outer dimensions of said box comprising the steps of positioning said receptacle box into said opening flush with the outer surface of said wallboard, inserting a substantially flat, three-legged, E-shaped fastening device between parallel outer sidewalls of said box and the edges of said opening with legs extending therefrom, bending a portion of the outer legs over the edges of said box, pulling on the center leg of each fastener device while holding the outer legs against the edge of said box until the backs of said devices are flat against the inside surface of said opening and the outer legs are formed in bracing relationship between the sidewalls of said box and the inner surface of said wallboard, and finally bending the extending portions of the center legs of said devices over the edges of said box into the interior thereof in a plane with the bent-over portions of said outer legs.

References Cited by the Examiner
UNITED STATES PATENTS

| | | | |
|---|---|---|---|
| 2,581,755 | 1/52 | Dieffenderfer | 220—3.6 |
| 2,635,778 | 4/53 | Dieffenderfer et al. | 220—3.6 |
| 2,762,591 | 9/56 | Weber | 248—27 |

CLAUDE A. LE ROY, *Primary Examiner.*